United States Patent [19]
Czerniecki

[11] Patent Number: 5,917,476
[45] Date of Patent: Jun. 29, 1999

[54] CURSOR FEEDBACK TEXT INPUT METHOD

[76] Inventor: George V. Czerniecki, 1030 S. Courtland Ave., Park Ridge, Ill. 60068

[21] Appl. No.: 08/718,892

[22] Filed: Sep. 24, 1996

[51] Int. Cl.$^6$ ....................................................... G09G 5/00
[52] U.S. Cl. .......................... 345/173; 345/156; 345/157; 345/174; 382/13
[58] Field of Search ..................... 345/173, 174, 345/175, 176, 177, 178, 156, 168, 172, 157; 382/13, 24, 57

[56] References Cited

U.S. PATENT DOCUMENTS

| 4,972,496 | 11/1990 | Klarew | 345/178 |
| 5,119,075 | 6/1992 | Smith | 345/173 |
| 5,327,160 | 7/1994 | Asher | 345/173 |
| 5,579,487 | 11/1996 | Meyerson et al. | 395/280 |
| 5,594,470 | 1/1997 | Meyerson et al. | 345/169 |

Primary Examiner—Jeffery A. Hofsass
Assistant Examiner—Davetta Woods

[57] ABSTRACT

A novel method of text input for pointing devices. In its preferred embodiment, the cursor feedback text input method forms the basis of a novel method of touch tablet typing, which enables a small touch tablet to function as an easy-to-use, general-purpose, computer input device. Text input, pointing, and drawing functions are all provided in a single convenient unit. This general-purpose input device is primarily intended for the newly emerging class of living room computers, for which no suitable input device appears to exist. The main objective of the cursor feedback text input method is to provide a human/computer hardware interface which transparently supports the addition of interactivity to the typical television viewing framework. A novel keyboard array is mapped onto, but not displayed on, the tablet active surface. The alphabet and number set are arranged in their normal order. Touching the tablet displays a preview character in place of the cursor. If this preview character is not the desired character, knowledge of alphabetical and numerical order guides the finger to the target. Lifting the finger inputs the character to the computer as if from a physical keyboard. Punctuation, and functions including shift, caps lock, tab, return, and backspace/delete, are efficiently handled by other means. Text can be input comfortably while resting the eyes on the text output at the cursor position, without any need for visual reference to an input device or to another part of the screen. This text input method can be learned in seconds, has a zero error rate, and requires only a trivial amount of computer memory.

9 Claims, 6 Drawing Sheets

CURSOR FEEDBACK TEXT INPUT METHOD

BACKGROUND—FIELD OF INVENTION

This invention relates to computer input devices, specifically to a novel method of text input for a touch tablet or other pointing device.

BACKGROUND—DESCRIPTION OF PRIOR ART

Computers intended for use in the living room or family room are now becoming available. Most are dedicated Internet-access and/or CD-ROM units adapted for output on a standard television set. One is a general-purpose computer equipped with a large screen monitor. All are meant to operate in a conventional television viewing environment. They are hampered, however, by the lack of an appropriate input device.

The recent explosive growth of the Internet, the World Wide Web, Email, and CD-ROM's, together with the deregulation of the telecommunications industry, have stimulated the development of a wide variety of interactive consumer products and services by a wide variety of industries. This unprecedented level of interest may finally establish computers as a ubiquitous presence like the telephone and the television.

Living room computers present a new human/computer hardware interface problem. Computers have thus far appeared in desktop, laptop, and palmtop configurations. None of these configurations have required an easy-to-use, general-purpose input device. The living room computers being shown thus far use input devices adapted from various computers, videogame machines, and television sets. None of these input devices are suitable for what is essentially computer operation in a TV viewing framework. The user is relaxing, usually in a reclined position, in a dimly lit room, and interacting with a distant screen. The lack of a desktop or other surface restricts the user to a hand-held or lap-held device.

A general-purpose computer input device should provide at least the basic functions of text input and pointing. To accomodate the casual living room environment, an input device would also have to be rugged, durable, spill-proof, and child-proof. To enhance marketing potential, it should be not only aesthetically pleasing, but also devoid of any data-processing associations which may inspire computerphobia. Above all, it must be easy to use. A search of the prior art has produced no material corresponding to the above requirements.

In order to duplicate the success of television, the living room computer should strive to duplicate the appeal of television, which is that it is an excuse to sit back and relax. Ideally, a living room computer input device would be a transparent addition to the typically effortless television viewing experience.

For the purposes of living room computing, existing computer input devices and TV remote controls are limited in function, hard to use, or awkward to handle. Remote controls are adapting to interactivity with the addition of a thumb-operated trackmarble to provide some measure of pointing capability. Nevertheless, remote controls are limited in function by the number of buttons a user can discern by feel in dim light.

A keyboard is the standard text input device. It requires training for proper operation, is cumbersome for casual laptop use, and is fairly fragile. An unskilled user needs substantial room light for hunting and pecking. Keyboards tend to arouse computerphobia, which generates sales resistance. The chorded variety of keyboard is sufficiently compact and designed for one-handed use, but learning chords is beyond the scope of a consumer appliance. Other text input devices include handwriting and speech recognition systems. Both require considerable training and have high error rates. They both also require large amounts of computer memory.

Pointing devices, including a mouse, joystick, trackball, tablet, and touchpad, do not offer text input capability. Adaptive systems for the disabled offer various text input alternatives based on some of the various pointing devices. However, they tend to be tedious for the able-bodied user. Also, they often make use of onscreen keyboards which occupy large amounts of valuable display area.

SUMMARY

The method of the present invention provides pointing devices with a convenient text input capability. The basic structure of this method provides a pointing device with a conventionally ordered alphanumeric array whose characters are shown individually in a preview display at the cursor position, allowing the user to point to the desired target character, guided by the knowledge of alphabetical and numerical order, before initiating input of that character. The method is most efficient when applied to a touch tablet, which can be operated with all five fingers. The user can monitor their onscreen text output continuously, without any visual reference to an input device. This eliminates the need for hunting and pecking, and for ambient light requirements. The method can be learned in a matter of seconds, has a near-zero error rate, and input speed increases intuitively with continued use. It occupies no permanent screen space.

A tablet is, by definition, excellent not only for pointing, but also for drawing. It is aesthetically pleasing, rugged, durable, spill-proof, and child-proof. It is not known to arouse computerphobia. A small tablet is convenient, easy to handle, and can be used comfortably in the casual, reclining positions typical of television viewing. The text input method of the present invention enables a small touch tablet to function as an easy-to-use, general-purpose, computer input device, well suited for use with living room computers and other information appliances.

OBJECTS AND ADVANTAGES

It is an object of this invention to provide an easy-to-use text input method for computers. It is a further object of this invention to provide an easy-to-use, general-purpose, computer input device. The following are additional objects and advantages:

(a) to provide an effective text input capability for pointing devices, and particularly for a touch tablet;

(b) to provide a computer input device suitable for use with consumer interactive products, information appliances, and similar technologies;

(c) to provide a computer input device which conveniently combines the basic functions of text input and pointing;

(d) to provide a computer input device which is simple and easy to use, requires little or no training, and has a low error rate;

(e) to provide a computer input device which provides maximum ease-of-use;

(f) to provide a computer input device which allows even the novice user to view their text output without interruption or distraction;

(g) to provide a computer input device which has no ambient light requirements;

(h) to provide a computer input device which requires no permanent screen display area;

(i) to provide a computer input device which is sufficiently rugged and durable for casual home use;

(j) to provide a computer input device which requires no auxiliary implements;

REFERENCE NUMERALS IN DRAWINGS 10 two-button touch tablet
11 active surface
12 left tablet button
13 right tablet button
14 computer
15 video screen
16 cursor of a text program
17 preview character display of invention
18 normal character display of text program
19 alphabetical character set array
20 novel keyboard array
21 function row
22 letter row
23 number row
24 punctuation row Description—FIGS. 1A to 4A The video screens and text characters in FIGS. 1A to 2D are scaled for emphasis. All reference numerals apply to their equivalent elements throughout the above series of Figures.

Figures 1A, 1B, 1C:
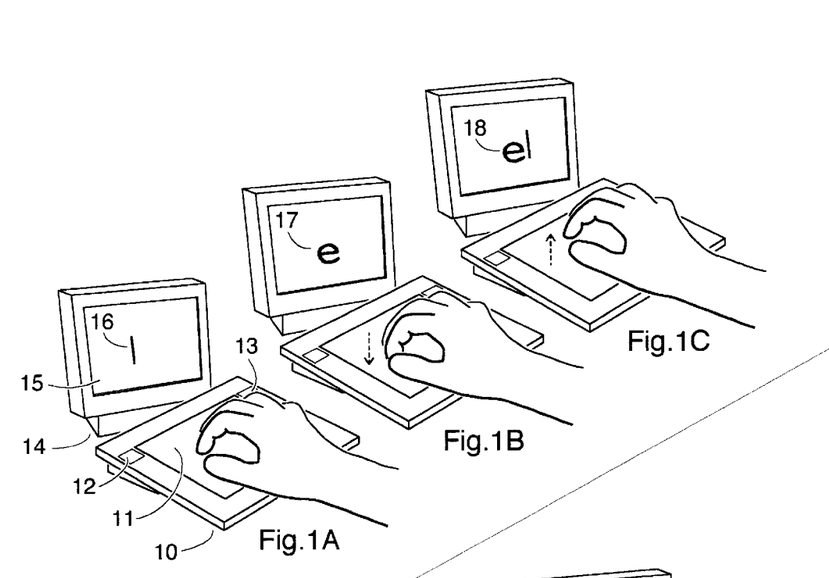
FIGS. 1A to 1C show an action sequence of a preferred embodiment of the present invention in operation, with a target character being immediately hit.
Figure 3:
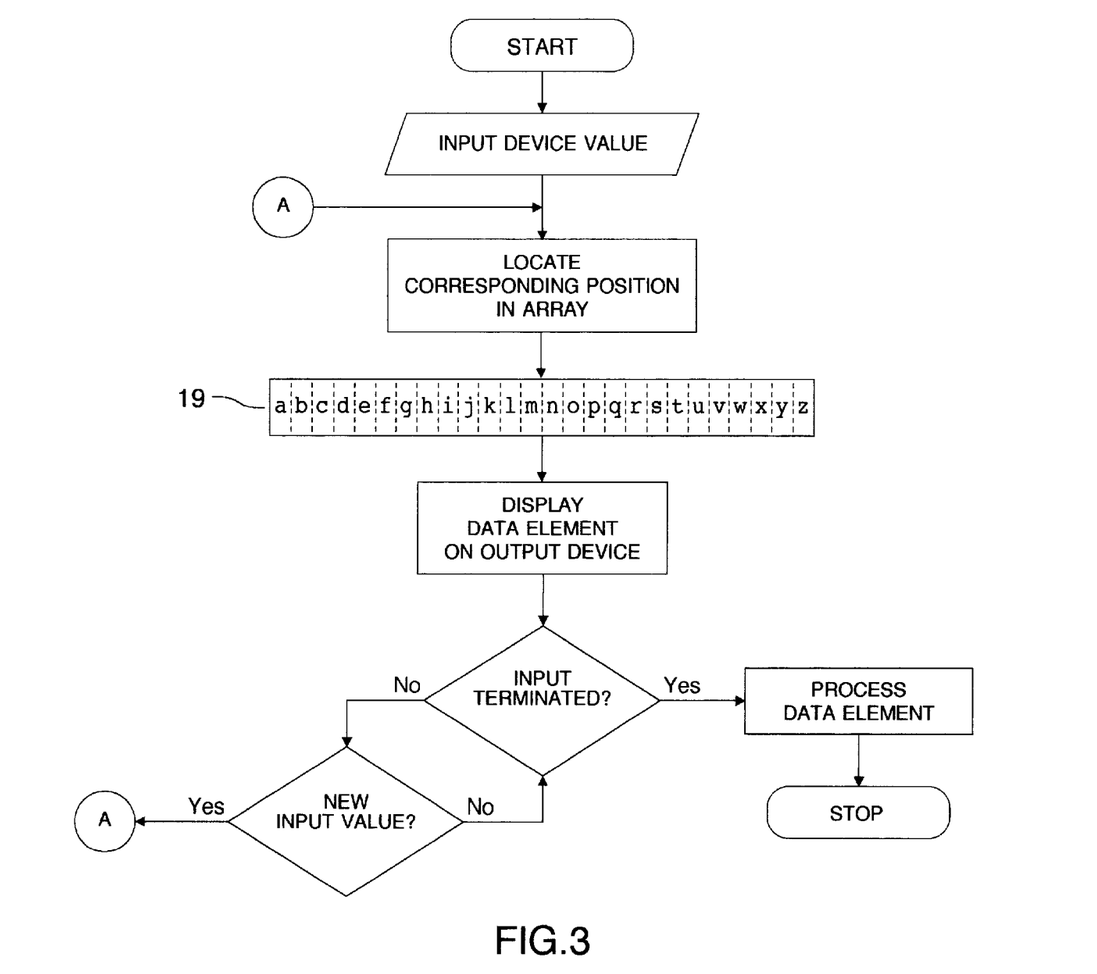
FIG. 3 shows a flowchart of a software program of a basic method of the present invention.
Figure 4A:
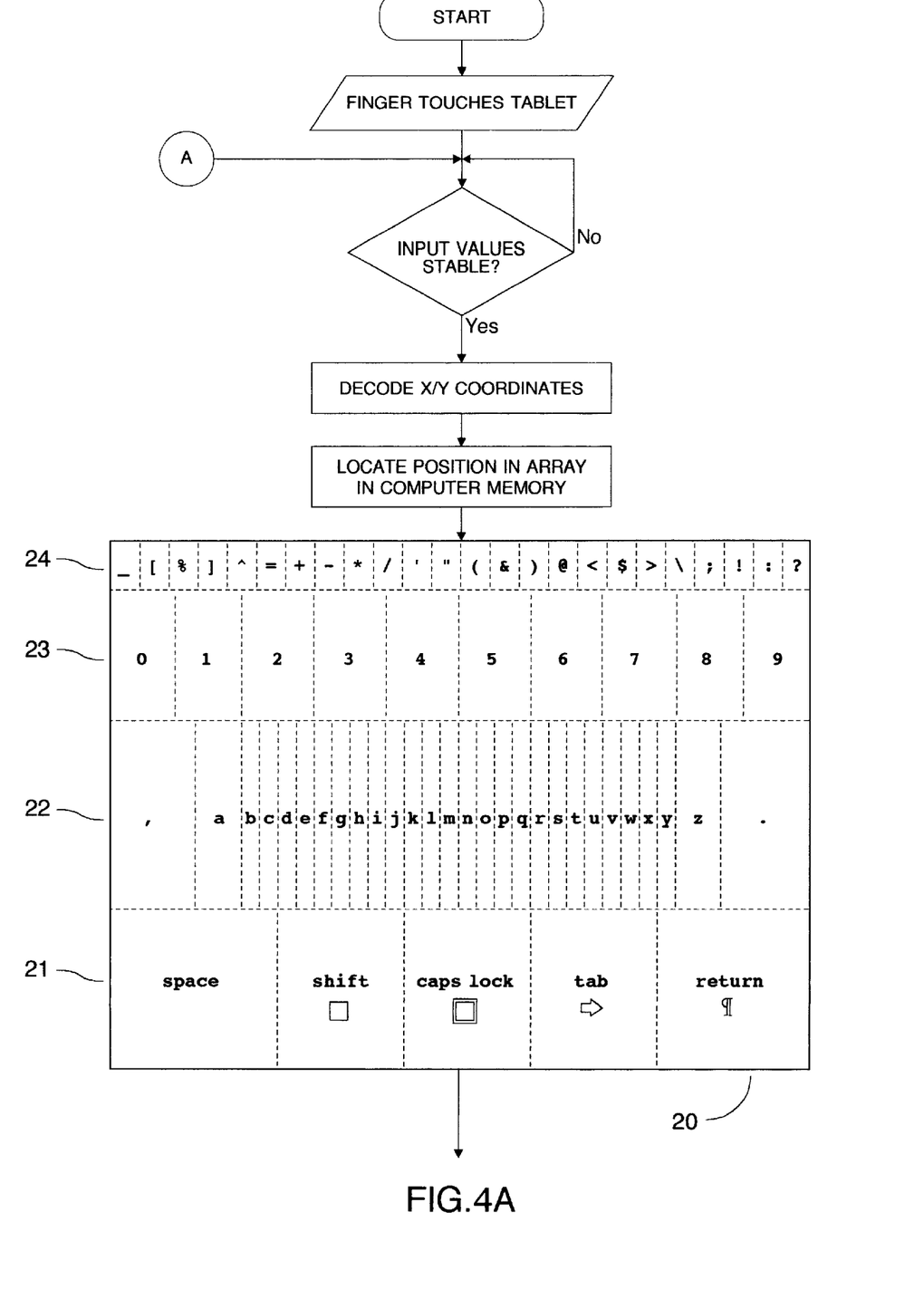
FIGS. 4A to 4C, 5 and 6 show flowcharts of a software program of the preferred embodiment of the present invention.

FIG. 1A shows a two-button touch tablet 10 and a video screen 15, both connected to a computer 14. A software program of the present invention and a text processing software program are stored in the memory of computer 14. The software program of the present invention contains a text character array. FIG. 3 shows an alphabetical character set array 19 as a simple example. FIG. 4A shows a novel keyboard array 20 of the preferred embodiment. A hand of a user is positioned above an active surface 11 of tablet 10. A cursor 16 of the text processing program is displayed on video screen 15.

FIG. 1B shows an index finger of the hand touching the active surface 11 of tablet 10. A preview character display 17 of the software program of the present invention is located in place of cursor 16. The preview character 17 displayed in this example is the intended target of the user.

FIG. 1C shows the index finger above the active surface 11 of tablet 10. A normal character display 18 of the text processing program is located in place of preview character display 17, followed by cursor 16.

Figures 2A, 2B, 2C, 2D:
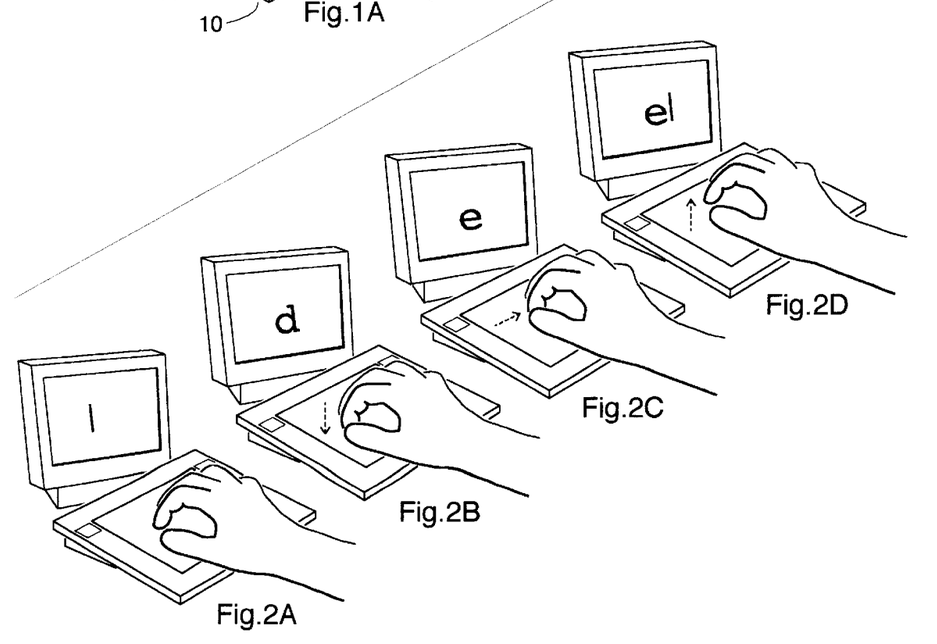
FIGS. 2A to 2D show an action sequence of the preferred embodiment of the present invention in operation, with the target character being initially missed.

FIG. 2A is identical to FIG. 1A.

FIG. 2B is identical to FIG. 1B with the exception that the character in preview display 17 is not the intended target of the user.

FIG. 2C shows the index finger in a new position corresponding to the alphabetical direction of the target character, which now appears in preview display 17.

FIG. 2D is identical to FIG. 1C.

FIG. 3 shows an alphabetical character set array 19 as a simple example of a data set having a known order.

FIG. 4A shows a two-dimensional, novel keyboard array 20 comprising a standard keyboard character set, including a function row 21, an alphabet row 22, a number row 23, and a punctuation row 24.

Operation—FIGS. 1A to 6

The cursor feedback text input method provides text input capability for pointing devices. The basic principle of this method can be applied to any data set having a known order. A data set can be stored in a computer as an array. A user knowing the order of the data set can use an input device to direct a software program to display any desired element of the array on an output device. The display of any initial element indicates to the user the current position of the input device in the array. Knowledge of the order of the array and display of subsequent elements guide the manipulation of the input device towards the intended target element. If the output device is a visual display, the data elements can be displayed in the same position, with each new element succeeding the previous one. The apparent effect is that of moving an array behind a discrete or single-element window opened onto the array. Once the target element is displayed, it is then available for further processing, to which is typically the input of the character to the text processing software program in the memory of the computer, or simply, the input of the character to the computer.

The software flowchart of FIG. 3 illustrates the basic principle of the cursor feedback text input method of the present invention. An input device value is used to locate a corresponding position in array 19. The data element in that position is displayed on an output device. Next, the current input value is tested. If input has terminated, the data element is then available for processing. If there is a new input value, the program branches back to the array position locator. If the input value is unchanged, the program loops between the previous two tests. The type of processing of the data element is dependent on the specific application. This flowchart describes a program suitable for devices generating intermittent input, such as a tablet, which generates significant values only when engaged or pressed. The software program takes advantage of this feature by initiating the processing of a displayed element when the tablet is disengaged or released. A software program (not shown) for devices generating continuous input, such as a mouse or joystick, would display input values continuously, with any processing of the data element being handled separately, by a button or switch.

In the cursor feedback text input method, the data sets having a known order are text character sets including an alphabet of A to Z, and a decimal number set of 0 to 9, such as are shown in the novel keyboard array 20. The input device is a pointing device such as a mouse, trackball, joystick, or tablet 10. The output device is a video screen 15. The data element display is a preview character display 17 which temporarily overlays the text insertion point or cursor 16. Processing of the target character consists of input, as if from a physical keyboard, to the computer 14. Pointing devices typically include at least one button which can be used to initiate input of the displayed target character. The preview character display 17 at the position of cursor 16 provides visual feedback for array navigation and character selection. If the character is the one desired, it may then be selected for input; if not, the pointing device can be used to move the target character into preview display 17.

A primary benefit of the cursor feedback text input method is that the user can take advantage of the established conventions of alphabetical and numerical order. There is no need to learn new skills, or new key arrangements or combinations. There is no need for the user to take his or her eyes off of the text output at the cursor position. There is no need to hunt and peck, and there is no need to strain the eyes by constantly shifting them between a keyboard and a distant screen. The rate of input is acceptable even at the novice level and it intuitively improves with use.

The cursor feedback text input method forms the basis of a novel method of touch tablet typing used in the preferred embodiment. The basic operation of the touch tablet typing method is illustrated in FIGS. 1A to 2D. Touch-sensitive graphics tablets, or simply, touch tablets, which were commonly available during the 1980's for use with 8-bit computers, respond to simple pressure. This is in contrast to the graphics tablets currently in use, which require an electronic stylus. The prototype of the present invention uses an Atari Touch Tablet together with an 8-bit Atari computer. These touch tablets were meant to be operated with a plain plastic stylus, but for the purposes of typing, light fingernail pressure is sufficient. The currently popular touchpad pointing devices use a conductive technology which offers a long lasting surface, since no pressure is required. The touchpad responds to skin conductivity, allowing tablet typing to be performed with the fingertips rather than the nails. The touch tablet has two main benefits as a platform for the cursor feedback text input method. One is that all five fingers can be used to access elements of an array across its width. The other is that input can be initiated by simply lifting the finger, without having to resort to a separate button or switch.

The array 20 (FIG. 4A) represents a novel keyboard layout. The novel keyboard array 20 corresponds to the active surface 11 of tablet 10, but is not depicted on tablet 10 itself. The user is guided by preview character display 17 and by knowledge of the order of the data sets, primarily the alphabet and the decimal number set. The text input capability provided by the touch tablet typing method enables the tablet to function as an easy-to-use, general-purpose, computer input device. The basic touch tablet typing method depends on three components:

1. knowledge of alphabetical and numerical order,
2. cursor feedback—the character preview in the cursor position provides visual feedback,
3. upstroke selection—the character is selected for input by lifting the finger.

The user may be in a relaxed position, reclining with feet propped up, for example, with tablet 10 resting on his or her lap. The user's hand rests with the heel of the palm on the bottom part of tablet 10, below active surface 11. Letter row 22 of array 20 is located below the natural position of the four fingers. The space key in function row 21 is located below the natural position of the thumb. With four fingers to access the 26 letters of the alphabet, the distance of any given letter is no more than two or three letters to either side of one of the fingers. The user, with a knowledge of alphabetical order, touches the tablet with the finger estimated to be closest to the intended target letter. The letter touched appears in preview display 17 on video screen 12, in place of cursor 13 displayed by the text processing program. If the preview display shows the target letter, lifting the finger inputs that letter to the computer, as if typed from a physical keyboard. Preview display 17 is then deleted and the text processing program displays the target letter and moves the cursor to the next appropriate position. There is no visible transition between preview display 17 of the letter and the normal display 18 of the text program. If the preview letter is not the one intended, the finger can be moved or slid across the tablet surface towards the target letter, in the direction indicated by alphabetical order. Again, when the target letter appears in preview display 17, it can be input by lifting the finger. The procedure for entering numbers is the same, using numerical order as a guide. The action of tablet typing is touch and lift, if the target is hit, and touch, slide and lift, if the target is initially missed. With continued use, the fingers learn to find their targets intuitively with increasing accuracy. The error rate is essentially zero due to the preview prior to input. The visual feedback provided by preview display 17 located in the position of cursor 16 allows the user to rest his or her attention on the current text output without interruption. There is no need to search for the next intended character on the input device or on another part of the video screen.

The space character is entered by pressing the thumb down on the space key, which is indicated in preview display 17 as a blank space, and lifting the thumb back up. Each of the remaining four keys in function row 21 can be accessed by curling a finger under and pressing down with the top surface of the fingernail. On a conductive surface, the finger can be curled slightly farther to touch with the skin of the knuckle. An appropriate symbol, as shown in FIG. 4A, for each of the functions—shift, caps lock, tab, and return—appears in preview display 17. The shift and caps lock keys are the only ones which do not result in immediate input. The shift key sets a frame around preview display 17, indicating that the next letter selected will be input in upper case, at which point the frame is deleted. The caps lock key sets a double frame around preview display 17, indicating that letters will continue to be input in upper case until the caps lock key is touched again, at which time the frame is deleted.

The alphabet and the number set are examples of data sets having an established known order. Their elements, as they appear in preview display 17, are specific elements. The four rows comprising the keyboard array constitute a four-element data set having a novel order which can quickly become known by the user. Its elements, as they appear in preview display 17, are representative elements of the row in which they are contained. If, for example, any number is displayed in preview display 17, it indicates that the finger is positioned below the punctuation row and above the letter row.

Letter row 22 conveniently includes the two most often used punctuation marks, the comma and period, at the beginning and end of the row, respectively. The basic method of this invention, which applies to data sets having a known order, does not easily apply to punctuation marks, which are numerous and have no established order. Therefore, in addition to preview display 17, punctuation row 24 is displayed above preview display 17 when any part of that row is touched. The activated punctuation mark is highlighted in this punctuation bar (not shown). The top edge of active surface 11 acts as a guide for the finger to slide against, allowing the punctuation row to be thin and still be navigated easily without sliding inadvertently into the row below.

Figure 4B:
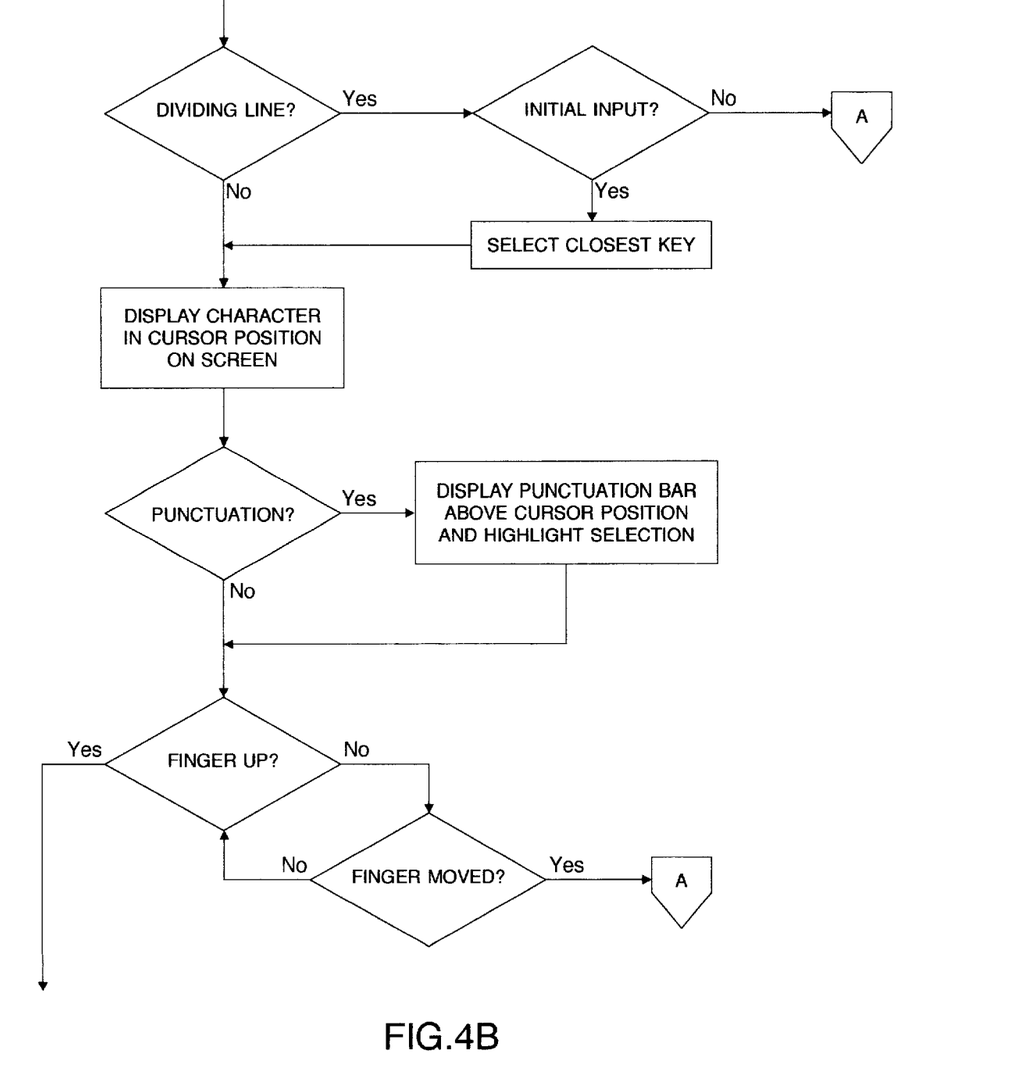
Figure 4C:
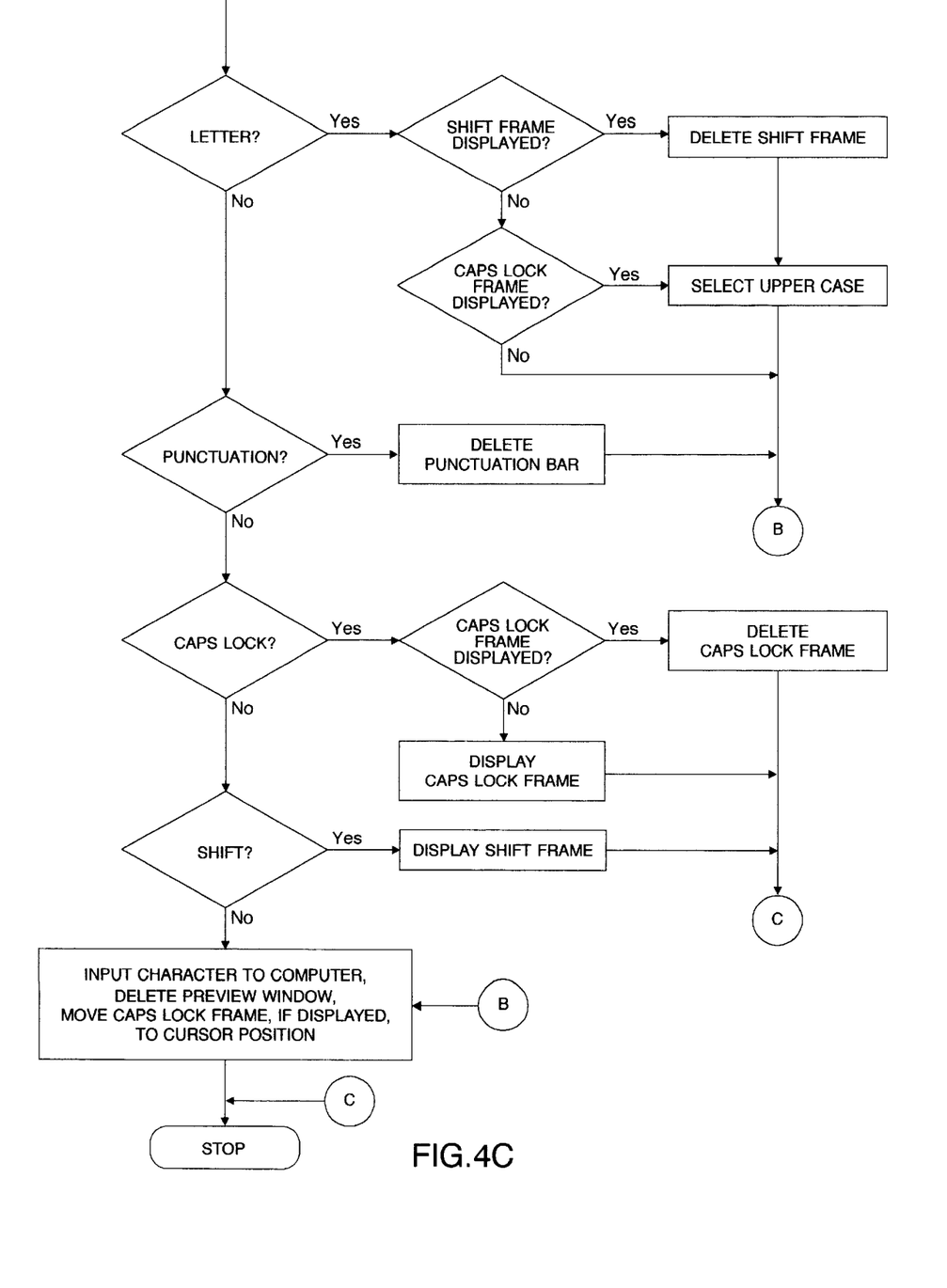
Figure 5:
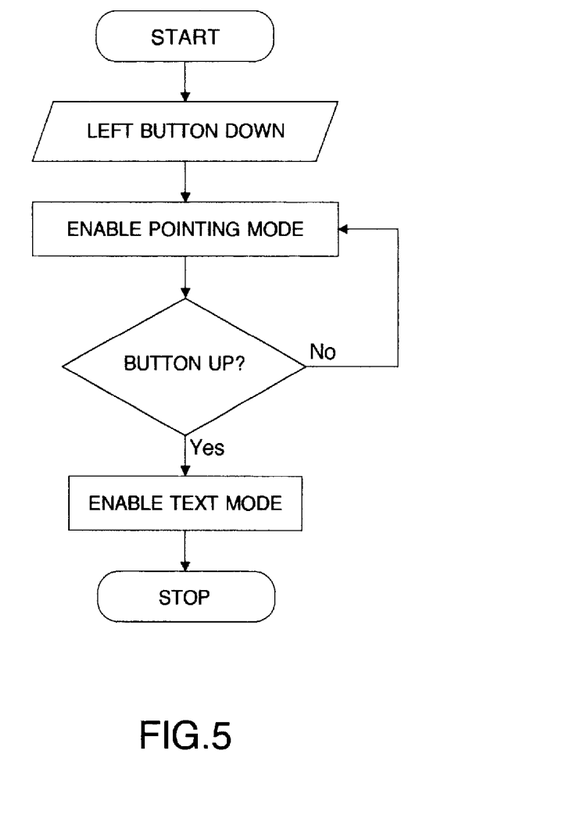

The above description of the operation of the tablet typing method is reflected in the software flowchart of FIGS. 4A to 4C, with the following additional notes. The input of the finger touching the tablet is first tested by a debounce routine, similar to that used with a physical keyboard, to delay further processing until the input value becomes stable. The dividing lines between the keys are thin null zones several points of resolution wide, to prevent flicker of adjacent characters when a dividing line is touched. In letter row 22, the first and last letters of the alphabet, A and Z, have wider keys to help prevent overshoot when moving inward from the large comma and period keys at the beginning and end of the row.

Figure 6:
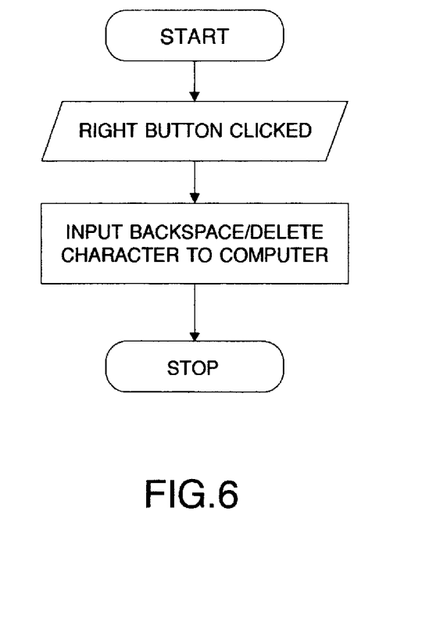

Array 20 comprises a typical keyboard character set, with the exception of backspace/delete, which is provided by right button 13 of two-button tablet 10, and flowcharted in FIG. 6. Although backspace/delete can be provided in the keyboard array, its unique function warrants a unique and easily accessable location which prevents accidental deletion. Left button 12 of two-button tablet 10 enables a pointing mode, allowing a pointer to be moved about the screen as long as the button is held down, as flowcharted in FIG. 5. This particular pointing method works comfortably here, but other methods of pointing or cursor control could be substituted if desired.

Although lifting the finger is the most direct means of initiating input with a touch tablet, other means are possible. Pressing a button to input the desired character, for example, could also be used, and this would be an appropriate input means for other types of pointing devices, such as the joystick, trackball and mouse.

The software program of the present invention can take at least two different forms. In one form, the software is an independent program which appropriates the area of the cursor position in a video buffer of the computer and displays preview display 17 on top of the cursor. At television-viewing distances, enhanced readability may be desired. In this case preview display 17 can be enlarged without disturbing the line spacing of nearby text. In the second form, the software may be part of a text processing program, in which case it has the option of directly manipulating the cursor character in a text buffer. Enhancing readability without disturbing surrounding text would seem to be reduced in this case to displaying preview letters of the alphabet in upper case. In either form, the apparent effect is that of the cursor itself providing feedback, as if the cursor were articulate. If desired, the cursor could be replaced altogether by a permanent preview display, made visible by a different background color, for example.

Although keyboard array 20 has been designed for maximum convenience, improvements and variations are possible and different layouts may be developed for specific applications. Also, the software program could be made to be customizable by the user. A variety of custom keyboard layouts could be stored for later use. Some examples of possible custom options are left-handed layout, custom punctuation layout, specialized character sets, special keys for boilerplate text or graphics, and key shape and size control. The software program could be made to adjust the width of the array to the span of the user's hand. Text input speed could be improved with the inclusion of an anticipatory glossary which completes words for the user as they are being entered.

Summary, Ramifications, and Scope

Thus the reader will see that the cursor feedback method of this invention provides effective text input capability for computer pointing devices. The touch tablet is the most efficient pointing device for use with this method because all the fingers of the hand can be used to access the character set array and because input can be initiated simply by lifting the finger. The tablet has the added benefit of being an excellent drawing tool. A text-capable touch tablet, then, constitutes an easy-to-use, general-purpose, computer input device, uniquely suited for use with living room computers and other consumer interactive products.

The text input method of the present invention can also be applied to touch screens, such as are found on information kiosks and personal digital assistants (compact portable computers). Also, Internet-access computers and CD-ROM players are being included in a new class of dedicated computers called "information appliances". This is an effort to create small, inexpensive, dedicated computers to perform various functions previously handled by a general-purpose computer. Currently, an Email phone and a kichen assistant are also available. The cursor feedback text input method of this invention can be applied to any of these having a touch screen, tablet, or any pointing device.

The touch tablet typing method is straightforward and intuitive, requires no training, has a near zero error rate, occupies no permanent screen area, and needs no ambient light. Most importantly, users can easily enjoy uninterrupted visual contact with their text output on the video screen. This feature is particularly significant because it allows interactivity to merge transparently with the established custom of television viewing.

The tablet itself is sufficiently compact that it can adapt itself to the user's comfort, that is, it can be operated in a variety of positions or postures, such as sitting back, reclining, laying down, etc. Additionally, the tablet is substantially rugged, durable, spill-proof, and child-proof. The aesthetically pleasing appearance of the tablet represents a marketing image benefit, in particular contrast to the keyboard and its phobic associations.

Although the description above may contain many specificities, these should not be construed as limiting the scope of the invention, but as merely providing illustrations of a preferred embodiment of this invention. For example, even though optimal usage of this method involves all five fingers of one hand, the basic method can be used with a minimum of a single digit or stylus equivalent—a toe, a mouthstick, etc. In an industrial application requiring protective clothing, one extended finger of a heavy rubber glove would be sufficient. This text input method can be adapted to any device capable of some kind of pointing—a mouse, joystick, trackball, a remote control with a trackmarble, perhaps even a biofeedback machine. A person capable of only head movement and blinking could use conventional head-tracking and eye-tracking sensors, by moving the head up and down to choose keyboard rows and side-to-side to preview characters, and blinking to select. A person capable of only moving the head from side-to-side could have the separate rows arranged in one continuous row. A keyboard array could be mapped onto the palm of a fingerless glove, possibly for use with a wearable computer. The user would then be able to type in the palm of his or her hand, while retaining fingertip sensitivity for normal tasks. In a Virtual Reality environment, a sensor glove could track finger movement and position over a virtual keyboard map continuously located at the user's fingertips. The output device need not necessarily be a video display—it could be a speaker sounding the keys to a visually-impaired user. The basic method of this invention could also be applied to other than textual data sets. Graphical elements, for instance, may be arranged in an array by known physical orders, such as size, shade or hue.

Thus the scope of the invention should be determined by the appended claims and their legal equivalents, rather than by the examples given.

I claim:

1. A method of selection of individual elements of a data set having a known order, comprising the steps of:
   a. actuating an input device, and
   b. observing an element of said data set, shown on a discrete display at an output location of an output device, by a software program controlled by said input device, and
   c. evaluating whether said element is or is not a target element, and
   d. directing, if required, said input device toward said target element, guided by subsequent sequential feedback, from said discrete display, of one or more said individual elements in said known order, and
   e. repeating steps b. to d. until said target element is shown on said discrete display, whereby selection of said target element requires reference only to said discrete display, without need for reference to said input device or elsewhere.

2. The method of claim 1 wherein said data set having a known order is an alphabetical or a numerical text character set.

3. The method of claim 1 wherein said input device is a pointing device.

4. The pointing device of claim 3 wherein said pointing device is a touch tablet.

5. The method of claim 1 wherein said output device is a visual display.

6. The method of claim 1 further including subsequent processing means for said selected target element, which may, if required, be activated by activating means appropriate lo said input device.

7. The subsequent processing means of claim 6 wherein said processing means include input means directed to a computer.

8. The input means directed to a computer of claim 7 wherein said input means includes input means directed to a text processing software program in said computer.

9. The method of claim 1 wherein said output location is at a text insertion point or cursor position provided by said text processing program.

* * * * *